Nov. 29, 1932.    G. PIRINOLI    1,889,290

LUBRICATING DEVICE FOR INTERNAL COMBUSTION ENGINES WITH INVERTED CYLINDERS

Filed April 7, 1931

Inventor
Guglielmo Pirinoli,
By Henry Orth Atty.

Patented Nov. 29, 1932

1,889,290

UNITED STATES PATENT OFFICE

GUGLIELMO PIRINOLI, OF TURIN, ITALY, ASSIGNOR TO FIAT SOCIETÀ ANONIMA, OF TURIN, ITALY

LUBRICATING DEVICE FOR INTERNAL COMBUSTION ENGINES WITH INVERTED CYLINDERS

Application filed April 7, 1931, Serial No. 528,381, and in Italy April 18, 1930.

In aircraft engines having some of their cylinders turned downwards, the lubricating oil escaping through the bearings and other lubricated members of the valve gear collects in the valve cover and is liable to disturb the engine working, if it is not suitably exhausted.

According to this invention I ensure a continuous discharge of the oil collecting in the valve cover arranged on the cylinder head by providing a small auxiliary pump which constantly sucks said oil and conveys it into the sump. The oil is thus totally recovered and returned into the cycle.

This pump can be of any suitable type and is generally arranged on the cylinder head and is driven by the cam shaft or by a similar driven member.

In star or radial engines the device is evidently employed only in connection with the cylinders of which the head is directed downwards or lies substantially horizontal.

The accompanying drawing shows by way of example a construction of the object of this invention in connection with a radial aircraft engine.

Figure 1:
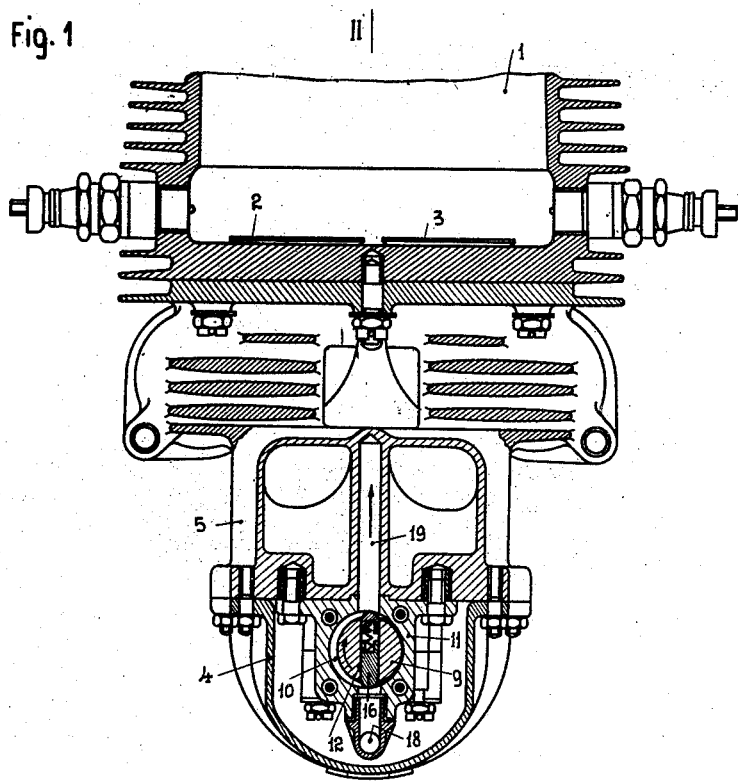
Figure 1 is a cross section of the head of a cylinder directed downwardly provided with my improved device.
Figure 2:
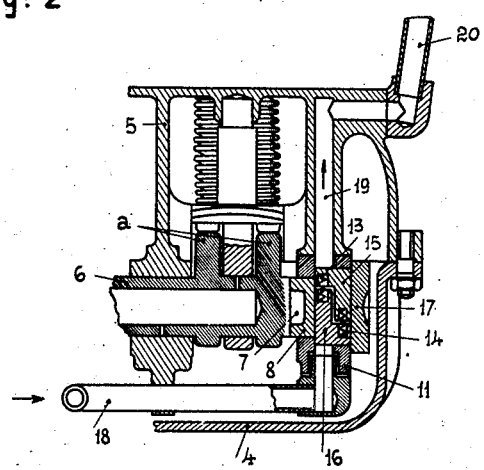
Figure 2 is a longitudinal section on line II—II of Fig. 1.

Referring to the drawing, 1 is the downward directed cylinder of a radial aircraft engine provided with air cooling and with valves 2 and 3 actuated by cams —a— carried by the cam shaft 6 mounted within a cover 4 fitted on the cylinder head 5.

The cam shaft 6 is provided at one end with a cross key 7 engaging a hub 8 correspondingly recesses of the rotatable body 9 of a vane pump. The body 9 is excentrically mounted in the inner hollow 10 of the pump body 11 and has a cross slit 12 receiving two slidable blades 15 and 16 with interposed springs 13 and 14.

The pump body 11 closed towards the outside by a cover 17 is connected with a conduit 18 reaching into the oil collecting on the bottom of the cover 4 and to a conduit 19 communicating through an outer connecting pipe 20 with the main oil sump.

The device according to this invention prevents any even small oil deposit in the cover 4 and obviates all disturbances in the engine working which would arise if the oil were not constantly and suitably discharged.

It will be obvious that the type of pump employed can be considerably different from the one employed in the construction shown and that other constructional details also can vary within wide limits without departing from the scope of this invention.

What I claim is:—

1. In an internal combustion engine having inverted cylinders, in combination with the head of the cylinders, a cam shaft mounted on said head and a cover on said head for enclosing said cam shaft, an auxiliary blade pump on an extension of said cam shaft, a suction pipe for said pump arranged in said cover so as to suck the lubricating oil collected in the cover bottom and a discharge pipe for said pump formed in the head of the cylinders for returning the lubricating oil into the cycle.

2. In an internal combustion engine having inverted cylinders, in combination with the head of the cylinders, a cam shaft mounted on said head and a cover on said head for enclosing said cam shaft, a blade pump wheel arranged in said cover co-axially to and at one end of said cam shaft, a groove and tongue connection between the adjacent ends of said shaft and said wheel, a pump body for said wheel secured to the head of the cylinders eccentrically to said wheel, a suction pipe connected to said pump body and arranged in said cover so as to suck the lubricating oil collected in the bottom of the cover and a discharge pipe for said pump formed in the head of the cylinders for returning the lubricating oil into the cycle.

In testimony that I claim the foregoing as my invention, I have signed my name.

GUGLIELMO PIRINOLI.